(12) United States Patent
Kriegshauser et al.

(10) Patent No.: US 6,618,676 B2
(45) Date of Patent: Sep. 9, 2003

(54) EFFICIENT AND ACCURATE PSEUDO 2-D INVERSION SCHEME FOR MULTICOMPONENT INDUCTION LOG DATA

(75) Inventors: Berthold Kriegshauser, Rio de Janeiro (BR); Steve McWilliams, Durango, CO (US); Otto Fanini, Houston, TX (US); Liming Yu, Stafford, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/060,108

(22) Filed: Jan. 29, 2002

(65) Prior Publication Data

US 2003/0055566 A1 Mar. 20, 2003

Related U.S. Application Data

(60) Provisional application No. 60/272,709, filed on Mar. 1, 2001.

(51) Int. Cl.[7] .............................. G01V 3/26; G01V 3/38
(52) U.S. Cl. ............................................. 702/7; 702/12
(58) Field of Search ........................ 702/6, 7; 324/338, 324/339, 343

(56) References Cited

U.S. PATENT DOCUMENTS

| | | | |
|---|---|---|---|
| 5,452,761 A | 9/1995 | Beard et al. | 166/250 |
| 5,703,773 A | 12/1997 | Tabarovsky et al. | 364/422 |
| 5,999,883 A | 12/1999 | Gupta et al. | 702/7 |
| 6,147,496 A | 11/2000 | Strack et al. | 324/343 |
| 6,366,858 B1 * | 4/2002 | Haugland | 702/7 |

OTHER PUBLICATIONS

T. Tamarchenko et al.; *Fast frequency domain electromagnetic modeling in axially symmetric layered media*, Radio Science, vol. 29, No. 4, pp. 979–992, Jul.–Aug. 1994.

* cited by examiner

Primary Examiner—Donald E. McElheny, Jr.
(74) Attorney, Agent, or Firm—Madan, Mossman & Sriram, P.C.

(57) ABSTRACT

A fast, efficient and accurate pseudo 2-D inversion scheme for resistivity determination of an anisotropic formation uses data from a tool (3DEX) comprising three transmitters and three corresponding receivers sampling the formation in a plurality of spatial directions. An initial model of the formation including invasion zones is obtained using a conventional multifrequency and/or multispacing logging tool. A pseudo 2-D inversion scheme combines an accurate full 2-D forward solution of the synthetic responses of the earth model with a 1-D approximation of the sensitivity matrix of the horizontally layered anisotropic background model. The timesaving compared to a regular 2-D inversion scheme can be tremendous. The applicability of this scheme is important in cases when borehole and near-zone effects do not allow an interpretation based on 1-D inversion. A comparison of the pseudo 2-D inversion scheme versus a full 2-D inversion using a realistic synthetic example shows that the pseudo 2-D inversion scheme performs as well as the full 2-D inversion, but in a much shorter time.

12 Claims, 4 Drawing Sheets

EFFICIENT AND ACCURATE PSEUDO 2-D INVERSION SCHEME FOR MULTICOMPONENT INDUCTION LOG DATA

CROSS-REFERENCES TO RELATED APPLICATIONS

This application claims priority from U.S. Provisional Patent Application Ser. No. 60/272,709 filed on Mar. 1, 2001, the contents of which are fully incorporated herein by reference.

BACKGROUND OF THE INVENTION

1. Field of the Invention

The invention is related generally to the field of interpretation of measurements made by well logging instruments for the purpose of determining the properties of earth formations. More specifically, the invention is related to a method for inversion of measurements made by multi-component induction or propagation sensors.

2. Background of the Art

Electromagnetic induction and wave propagation logging tools are commonly used for determination of electrical properties of formations surrounding a borehole. These logging tools give measurements of apparent resistivity (or conductivity) of the formation that when properly interpreted are diagnostic of the petrophysical properties of the formation and the fluids therein.

The physical principles of electromagnetic induction resistivity well logging are described, for example, in, H. G. Doll, Introduction to Induction Logging and Application to Logging of Wells Drilled with Oil Based Mud, Journal of Petroleum Technology, vol. 1, p. 148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. No. 4,837,517; U.S. Pat. No. 5,157,605 issued to Chandler et al, and U.S. Pat. No. 5,452,761 issued to Beard et al.

A limitation to the electromagnetic induction resistivity well logging instruments known in the art is that they typically include transmitter coils and receiver coils wound such that the magnetic moments of these coils are substantially parallel only to the axis of the instrument. Eddy currents are induced in the earth formations from the magnetic field generated by the transmitter coil, and in the induction instruments known in the art these eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are the ones which are typically hydrocarbon-bearing and are of the most interest to the instrument user. Some earth formations which might be of commercial interest therefore may be overlooked by interpreting a well log made using the electromagnetic induction resistivity well logging instruments known in the art.

Baker Atlas and Shell International E&P jointly developed a new multicomponent induction logging tool, 3DEX to measure the electrical anisotropy of these sequences. This logging tool and its use is described in U.S. Pat. No. 6,147,496 to Strack et al. The instrument comprises three mutually orthogonal transmitter-receiver configurations that provide all necessary data to compute horizontal and vertical resistivities of the formation. These resistivities may then be used in an integrated petrophysical analysis to provide an improved estimate of the laminar sand resistivity and corresponding net oil-in-place.

U.S. Pat. No. 5,999,883 issued to Gupta et al, (the "Gupta patent"), the contents of which are fully incorporated here by reference, discloses a method for determination of the horizontal and vertical conductivity of anisotropic earth formations. Electromagnetic induction signals induced by induction transmitters oriented along three mutually orthogonal axes are measured. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to a one of the orthogonal axes which is also perpendicular to the instrument axis. A relative angle of rotation of the perpendicular one of the orthogonal axes is calculated from the receiver signals measured perpendicular to the instrument axis. An intermediate Measurement tensor is calculated by rotating magnitudes of the receiver signals through a negative of the angle of rotation. A relative angle of inclination of one of the orthogonal axes, which is parallel to the axis of the instrument is calculated, from the rotated magnitudes, with respect to a direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter.

However, the new horizontal magnetic field responses, $H_{xx}$ and $H_{xx}$, that are sensitive to the vertical resistivity of the formation can suffer from strong borehole and near-zone effects. These effects increase with borehole size, borehole fluid conductivity, and invasion depth. Co-pending U.S. patent application Ser. No. 09/676,097 U.S. Pat No. 6,466,872, by Kriegshäuser et al. describes a method for applying shoulder bed corrections to this data. However, in large borehole sizes and conductive mud systems, these corrections cannot completely eliminate the near-zone effects.

However, a rigorous 2-D inversion is too time-intensive and prohibitive for typical logging applications, because the 2-D forward model response is time consuming and also because inversion schemes typically require the determination of a Jacobian matrix defining the sensitivity of each of the measurements to every one of the parameters in the model.

Tabarovsky and Rabinovich (U.S. Pat. No. 5,703,773) teach a computationally fast method for 2-D inversion of induction logging data. The method includes skin effect correcting the responses of the receivers by extrapolating the receiver responses to zero frequency. A model is generated of the media surrounding said instrument. Conductivities of elements in the model are then adjusted so that a measure of misfit between the skin-effect corrected receiver responses and simulated receiver responses based on the model is minimized. The geometry of the model is then adjusted so that the measure of misfit between the skin-effect corrected receiver responses and the simulated receiver responses based on the model is further minimized. In a preferred embodiment of the invention, the step of adjusting the geometry includes minimizing the measure of misfit between the simulated responses and the receiver responses from selected ones of the receivers closely spaced to the transmitter. Numbers of and positions of radial boundaries are then determined by minimizing the measure of misfit for all the receiver responses. However, Tabarovsky does not address the problem of inversion of multi-component data.

There is a need for a method of inversion of multicomponent induction logging data that gives reasonably accurate results without using an inordinate amount of computer time. The present invention satisfies this need.

SUMMARY OF THE INVENTION

An electromagnetic logging tool having a plurality of transmitters and receivers (3DEX) is used to obtain multi-component measurements indicative of horizontal and vertical resistivities of subsurface formations. A model for the horizontal resistivity, length of the invasion zone and resistivity of the invasion zone may be obtained from High Definition Induction Logging (HDIL) tools. Such an induction logging tool comprises transmitter and receiver coils with axes parallel to the tool axis: measurements are made at multiple frequencies and/or with multiple transmitter-receiver spacings. An example of such a tool is given in U.S. Pat. No. 5,452,761 to Beard et al. An initial model is defined that includes the obtained model and vertical resistivities for the formations. In one embodiment of the invention, the vertical resistivities for the initial model are set equal to the horizontal resistivities. In alternate embodiment of the invention, the horizontal and vertical resistivities may be related by a predefined anisotropy factor. A 2-D forward response modeling is carried out and a difference between the model output and the actual measurements made with the 3DEX is determined. If the difference is small, the model is acceptable. Otherwise, the model is iteratively updated with only a subset of the model parameters being changed, so as to reduce the difference. The updating uses only the sensitivity of a subset of the measurements to the subset of the model parameters being changed.

In a preferred embodiment of the invention, the subset of the model parameters being changed includes the layer horizontal and vertical resistivities, while the layer thicknesses, length of the invasion zone and resistivity of the invasion zone are kept fixed.

In a preferred embodiment of the invention, the subset of measurements for which the sensitivity is used includes the $H_{zz}$ component and at least one of (i) the $H_{xx}$ component, (ii) the $H_{yy}$ component, and, (iii) an average of the $H_{xx}$ and $H_{yy}$ components.

BRIEF DESCRIPTION OF THE FIGURES

The present invention is best understood with reference to the following figures in which like numbers refer to like components FIG. 1 (Prior Art) shows an induction instrument disposed in a wellbore penetrating earth formations.

DETAILED DESCRIPTION OF THE INVENTION

Figure 1:
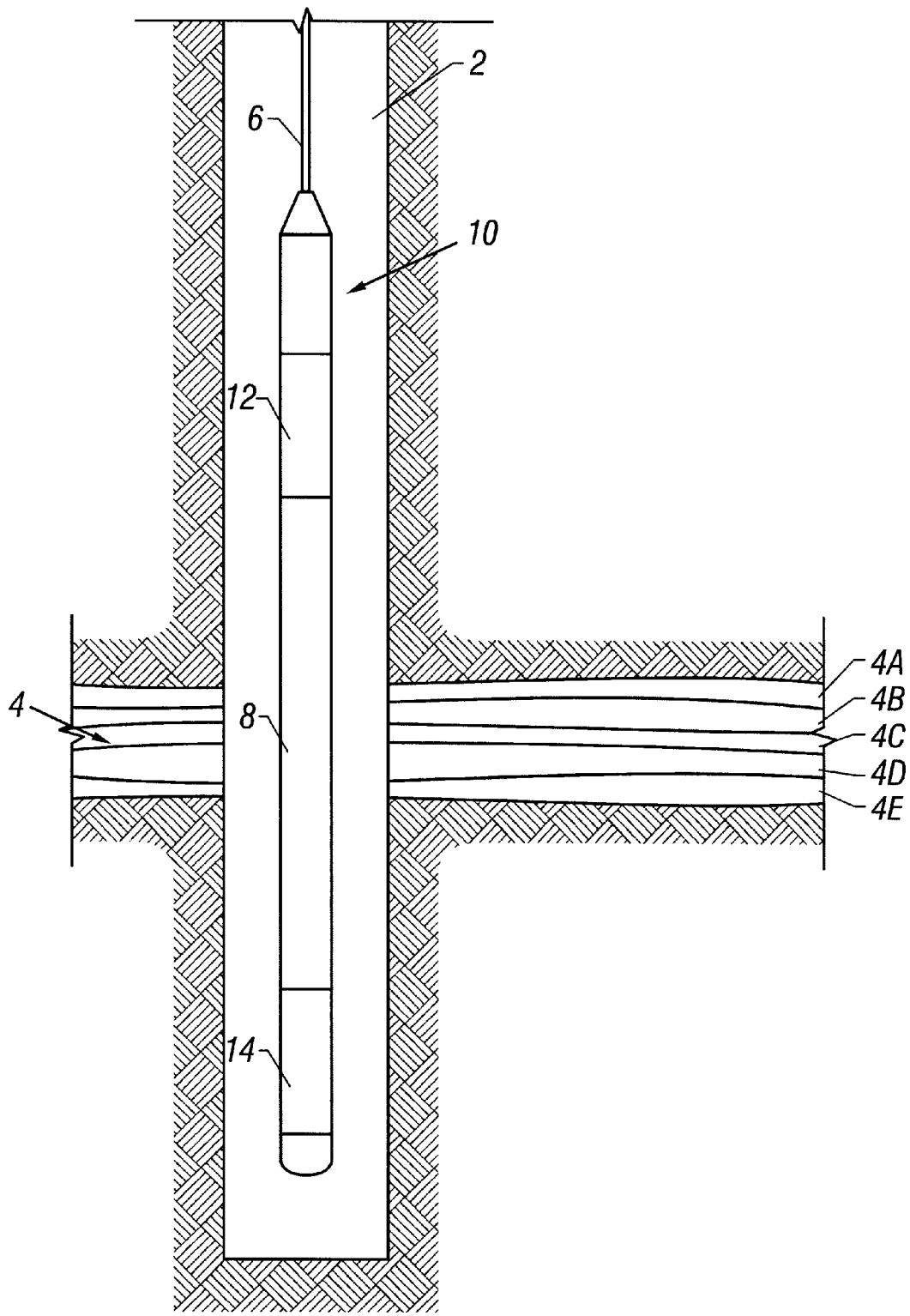

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by means of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 2:
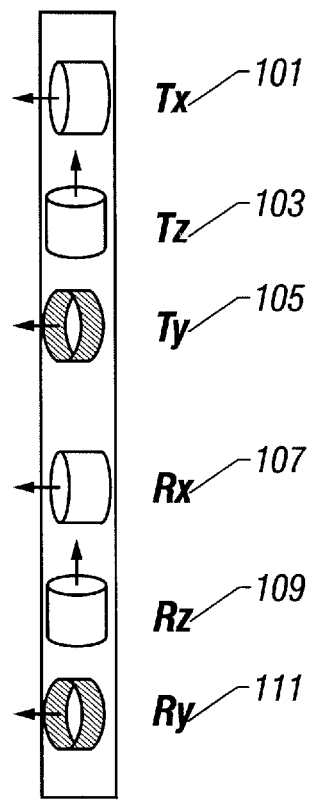
FIG. 2 (Prior Art) shows the arrangement of transmitter and receiver coils in a preferred embodiment of the present invention marketed under the name 3DExplorer™

Referring to FIG. 2, the configuration of transmitter and receiver coils in a preferred embodiment of the 3DExplorer™ induction logging instrument of Baker Hughes is shown. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields. In a preferred mode of operation of the tool, the $H_{xx}$, $H_{yy}$, $H_{zz}$, $H_{xy}$, and $H_{xz}$ components are measured, though other components may also be used.

Figure 3:
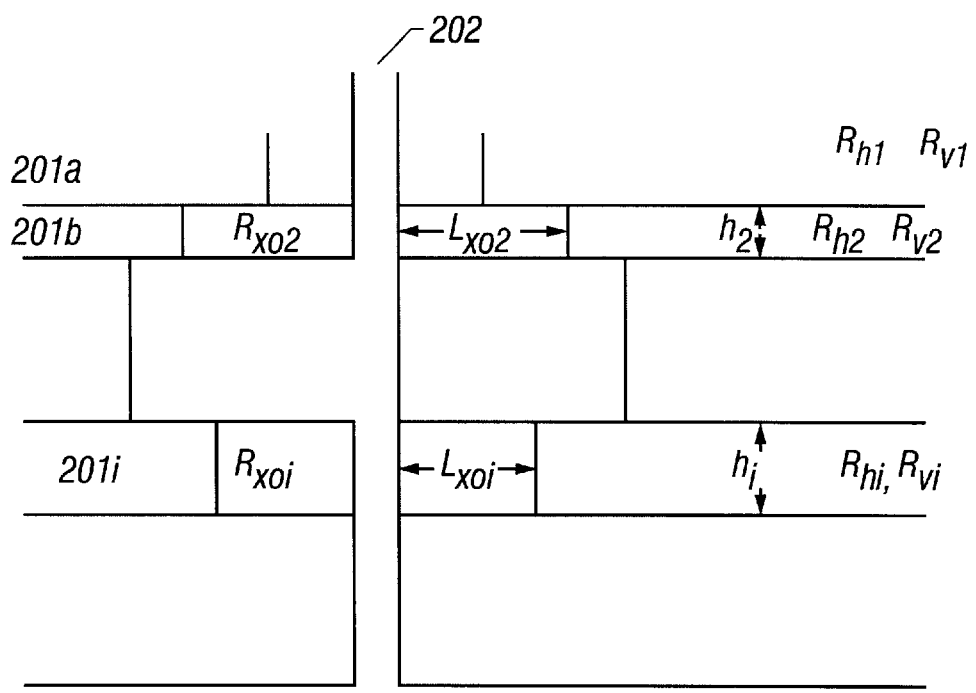
FIG. 3 is a schematic illustration of the model used in the present invention

FIG. 3 is a schematic illustration of the model used in the present invention. The subsurface of the earth is characterized by a plurality of layers $201a$, $201b$, ... $201i$. The layers have thicknesses denoted by $h_2$, $h_3$ ... $h_{i-j}$. The horizontal and vertical resistivities in the layers are denoted by $R_{h1}$, $R_{h2}, \ldots R_{hi}$ and $R_{v1}$, and $R_{v2}, \ldots R_{vi}$ respectively. Note that the top and bottom layers are semi-infinite in the model. The borehole is indicated by 202 and associated with each of the layers are invaded zones in the vicinity of the borehole wherein borehole fluid has invaded the formation and altered its properties so that the electrical properties are not the same as in the uninvaded portion of the formation. The invaded zones have lengths $L_{xo1}, L_{xo2}, \ldots L_{xo1}$ extending away from the borehole. The resistivities in the invaded zones are altered to values $R_{xo1}, R_{xo2}, \ldots R_{xo1}$. In the embodiment of the invention discussed here, the invaded zones are assumed to be isotropic while an alternate embodiment of the invention includes invaded zones that are anisotropic, i.e., they have different horizontal and vertical resistivities. The assumption of an isotropic invasion zone is reasonable because in the case that the borehole fluid is conductive and invades a laminated sand/shale layer, then the pore fluid of the sand laminae is filled with conductive borehole mud fluid. Hence, the sand laminae become as conductive as the shale laminae, making this invaded zone isotropic. If the borehole fluid is resistive and invades the sand/shale layer, then the resistive pore fluid of the sand laminae is replaced by resistive borehole fluid. Hence, there is no significant resistivity contrast between the invasion zone and the anisotropic formation layer.

The observed data D may be defined as a function of the model parameters m as $$D = f(m)$$

or, in matrix form, $$\begin{bmatrix} d_1 \\ d_2 \\ \vdots \\ d_{l-1} \\ d_l \end{bmatrix} = \begin{bmatrix} f_1(m) \\ f_2(m) \\ \vdots \\ f_{l-1}(m) \\ f_l(m) \end{bmatrix}$$

is the vector of observations
where $$[m] = [m_1 m_2 m_3 m_4 m_5 \ldots m_{1-4} m_{1-3} m_{1-2} m_{1-1} m_1]^T = [R_{xo1} L_{xo1} R_{h1} R_{v1} R_{xo2} L_{xo2} R_{h2} R_{v2} h_2 \ldots h_{k-1} R_{xok} L_{xok} R_{hk} R_{vk}] \quad (1)$$

is a model vector comprising layer thicknesses, horizontal and vertical resistivities of the layers, length of the invasion zones in each of the layers and resistivity of the invasion zone in each of the layers. There are k layers in all, so that for the preferred embodiment of the invention where the invaded zone is characterized by a length of the invaded zone and a single resistivity, m is a vector of length 5 k−2. For a full 2-D inversion, the data vector could comprise all the components of measurements made with the 3DEX$^{SM}$ tool. In a preferred embodiment of the present invention, the $H_{zz}$ component and at least one of (i) the $H_{xx}$ component, (ii) the $H_{yy}$ component, and, (iii) an average of the $H_{xx}$ and $H_{yy}$ components are used. As would be known to those versed in the art, in a borehole drilled perpendicular to bedding, for example a vertical wellbore and horizontal formation layering, all cross-components are zero.

Figure 4:
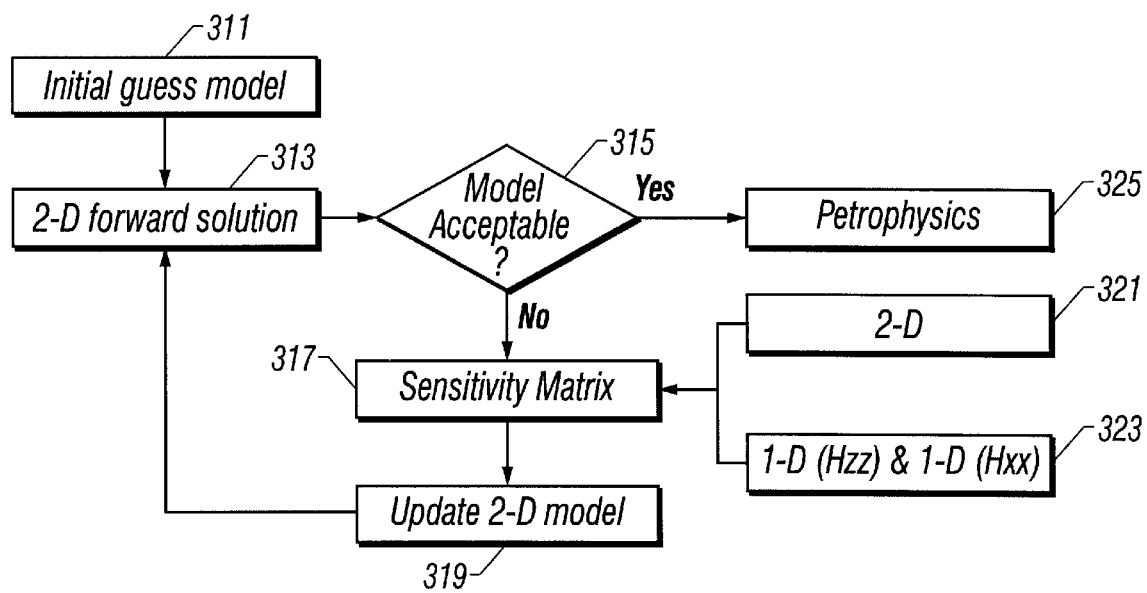
FIG. 4 shows a generic data flow of the inversion scheme employed in the present invention

The pseudo 2-D inversion scheme uses a full forward solution of the 2-D formation model (Tamarchenko and Tabarovsky, 1994) to compare the synthetic responses with the measured data. The method disclosed therein is a fast hybrid numerical technique that combines integral equations and finite difference methods to simulate the electromagnetic field of an arbitrary source. FIG. 4 shows a generic data flow of the inversion scheme employed. An initial estimate of a 2-D model is defined 311. This may be done using prior art methods: for example, the model of layer thicknesses and horizontal resistivity may be obtained by analysis of conventional High Definition Induction Logs (HDIL) obtained from prior art devices comprising a coaxial transmitter and a plurality of coaxial receivers at different spacings from the transmitter. The parameters of the invasion zone may similarly be obtained from HDIL data.

In the initial model, the vertical resistivity may be set equal to the horizontal resistivity in each layer. Alternatively, if the lithology of the individual layers is known (from other logs), an assumption may be made relating the anisotropy ratio of each layer (the ratio of vertical to horizontal resistivity) to the lithology. The inversion scheme then generates a 2-D forward solution to the model 313 using, for example, the Tamarchenko and Tabarovsky method. The output of the model 313 is compared with actual field measurements made by the 3DEX tool to determine if the model is acceptable 315. If the model is acceptable, then the model may be further analyzed to provide petrophysical information 325 about the subsurface formations using known methods. If the model is not acceptable, a sensitivity matrix is determined that relates the model output to the model parameters 317 and the model is then updated 319. The formation parameters are updated using a Marquardt-Levenberg method.

In conventional 2-D inversion, the sensitivity matrix would be determined for the entire set of observations using the entire 2-D model vector as defined above with reference to FIG. 3. This is would be done by iteratively updating m to minimize $$O_d = \|D^{obs} - f(m)\|^2 \quad (2)$$

where $D^{obs}$ are the observations and $O_d$ is a data objective function.

In FIG. 4, the full 2-D inversion would involve the minimization of eq. (2), using the full model vector m from 321, and determining the full sensitivity matrix of $O_d$ to all the parameters in the model. This requires determination and inversion of a Jacobian matrix of sensitivities $$\left[ \frac{\partial d_i}{\partial m_j} \right],$$

which is a matrix comprising l rows and 5 k=2 columns. In the present invention, a partial Jacobian matrix of sensitivities is used with respect to a subset m' of model parameters.

The subset m' of the model m comprises only the formation parameters, i.e., the layer thicknesses and resistivities, and the remaining components of the model m are assumed to be known. The invasion zone parameters, Rxo and Lxo, can for example, be derived from HDIL data or any other a priori information. However, the inversion process does not alter these parameters of the invasion zone. In other words, the iterative procedure only updates the model m'. Note, however, that the forward model solution 313 is still a full 2-D model including the invasion zone effects.

As a further approximation, the sensitivity matrix is determined for only a subset of the measurements 323 using only the $H_{zz}$ and at least one of (i) the $H_{xx}$ component, (ii) the Hyy component, and, (iii) the average of the Hxx and Hyy components of the data. The sensitivity matrix, however, is determined for an objective function defined for a layered 1-D model of a horizontally layered formation.

$$O' = \|\hat{D}^{obs} - \hat{f}(m')\|^2 \quad (3)$$

By using this approximation of the sensitivity matrix, computations are greatly speeded up.

EXAMPLE

Next, an illustrative example of the use of the pseudo 2-D inversion scheme on a simple but yet realistic and typical 2-D model is shown. The formation parameters of the layered anisotropic background model are shown in Table 1. The borehole diameter is 12.25 inches, and the borehole mud resistivity is 0.1 Ohm-m. The synthetic example shown is typical for well logging applications, when seawater is used as drilling fluid.

TABLE 1

RESISTIVITY MODEL PARAMETERS

| Layer boundaries | $R_h$ (Ω-m) | $R_v$ (Ω-m) |
| --- | --- | --- |
| <0 | 0.8 | 1.2 |
| 36893 | 1.1 | 5 |
| 36955 | 1.5 | 7.9 |
| 37048 | 10 | 12 |
| 37080 | 1 | 1.3 |
| 37147 | 15 | 17 |
| 14–16 | 1 | 1.3 |
| 16–20 | 12 | 15 |
| 20–22 | 2.4 | 10.7 |
| 22–24 | 1 | 4.3 |
| >24 | 0.9 | 0.9 |

The parameter resolution can be studied qualitatively with 'back-transformed singular values' (BTSV) (Jupp and Vozoff, 1977; Hördt, 1992). To define the BTSV, we begin with the singular value decomposition of the Jacobian matrix J, $J=USV^T$, where U is the orthonormal matrix of data eigenvectors, V is the orthonormal parameter eigenvector matrix and S is the diagonal matrix containing the singular values of $J^T J$ (e.g., Jupp and Vozoff, 1974).

Now, we introduce the diagonal matrix K, composed of the normalized singular values ($k_j=s_j/s(1) j=1,2 \ldots m$) as diagonal. S(l) is the largest singular value; m is the number of parameters. The norm of each column of the matrix VK is called the back-transformed singular value (BTSV), and is considered to be a measure of the importance of the contribution of parameter $p_i$ to reduce the data misfit in the inverse process. BTSV varies between zero and one, where the value is directly proportional to the importance of the parameter.

Figure 5:
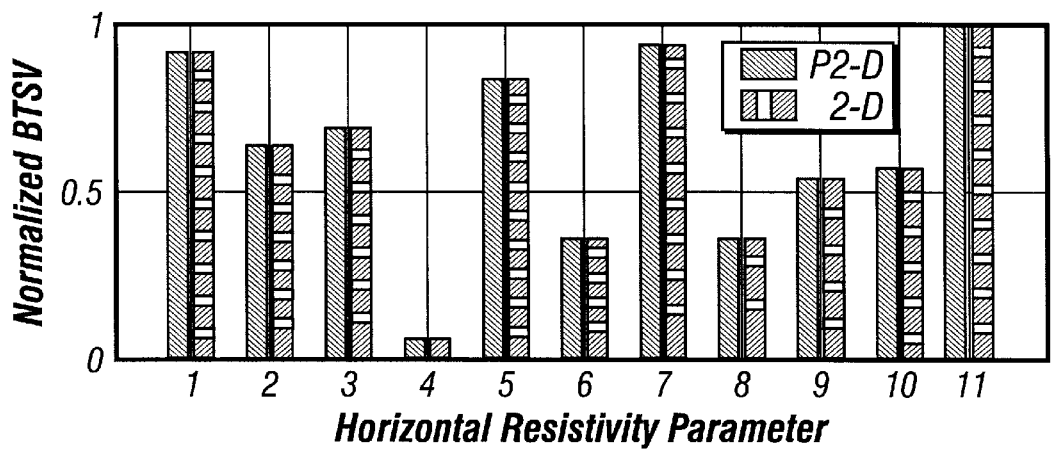
FIG. 5 shows a comparison of back transformed singular values for a 1-D and 2-D formation model.
Figure 5:
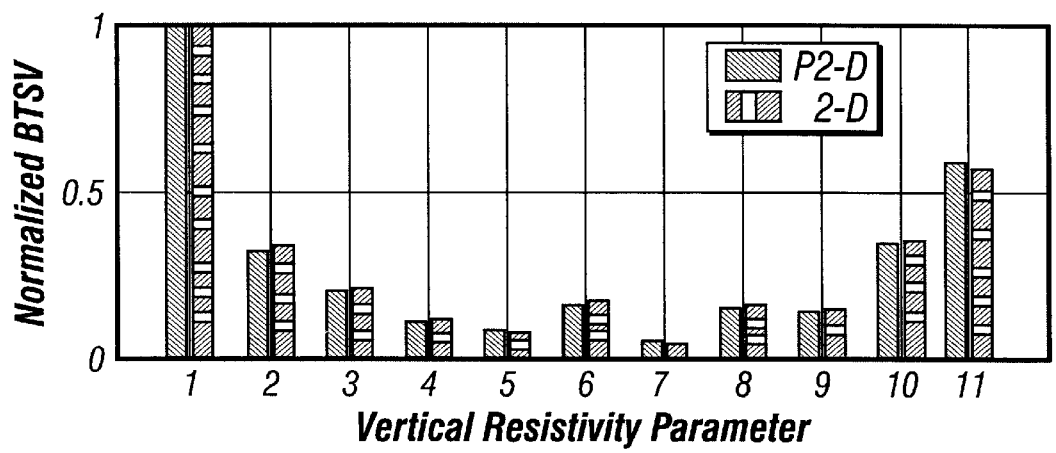

FIG. 5 shows the corresponding BTSV for both the 1-D and 2-D formation models. The bar chart clearly shows that the BTSV are almost identical for the 1-D and the 2-D models. This similarity indicates that a 1-D Jacobian can be used in the pseudo 2-D inversion process and that the formation parameter resolution should be almost identical compared to the full 2-D inversion.

Figure 6:
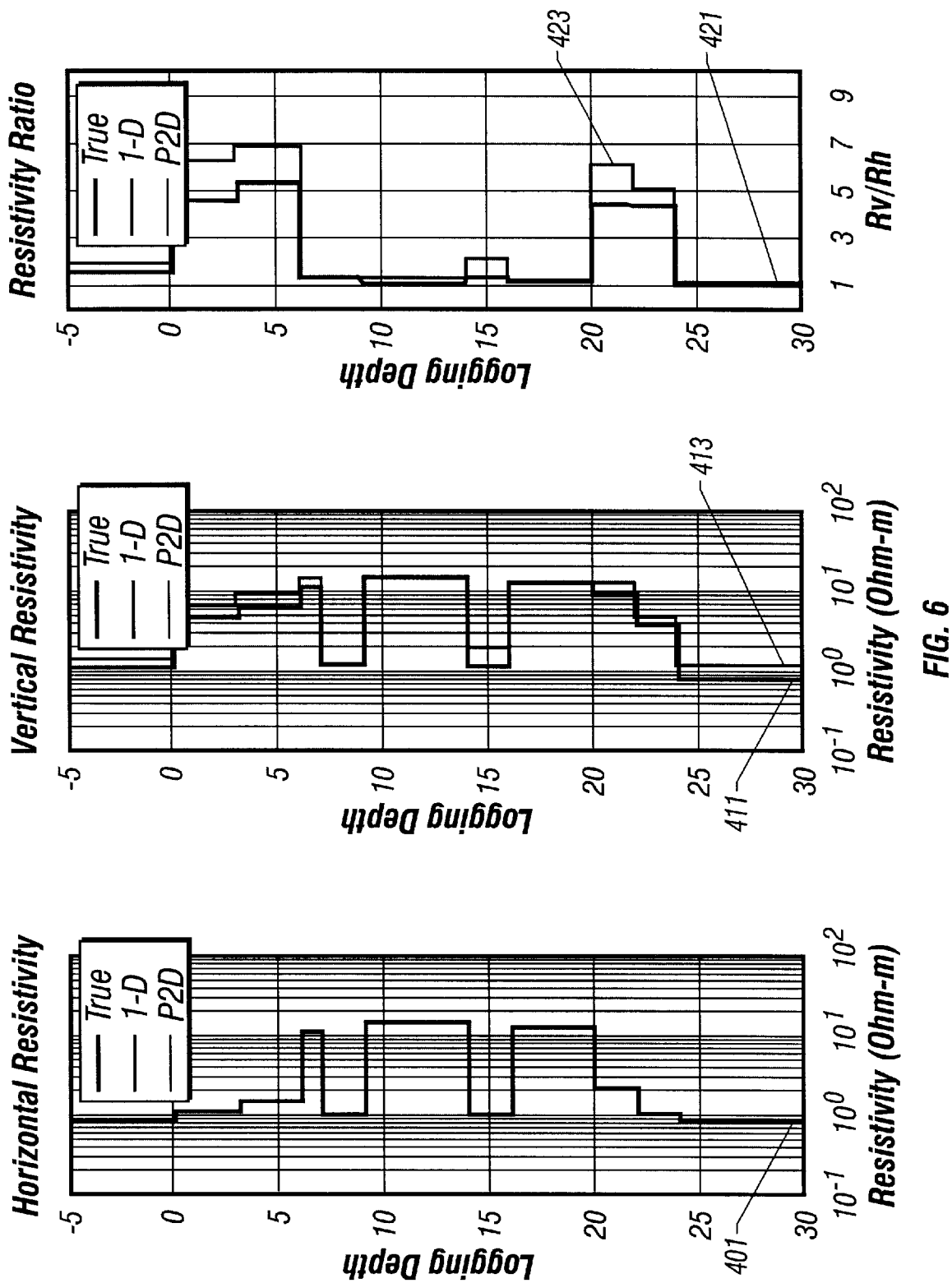
FIG. 6 shows a comparison of inversion results using a 1-D inversion and the P2D inversion method of the present invention with a model.

These synthetic responses are then inverted using a 1-D inversion scheme and the results compared with the final iterate of the pseudo 2-D inversion scheme (FIG. 6). In the inverse process we only inverted for horizontal and vertical resistivities of the formation layers. The 1-D inversion scheme assumes no borehole and invasion zones in the synthetic formation model. Layer boundaries and borehole parameters are known and fixed during inversion. This assumption is usually valid in logging applications. FIG. 6 shows a comparison of the true formation resistivity parameters, the recovered model parameters using a 1-D inversion scheme, and the pseudo 2-D final iterates (P2D).

The horizontal resistivity values for the 1-D inversion and the P2D inversion are substantially the same as the true value 401. The vertical resistivity obtained by the P2D is substantially identical to the true value 411 but the 1-D inversion 413 is clearly erroneous at certain depths, so that the determined resistivity ratio from the P2D is correct 421 while the determined resistivity ratio from the 1-D inversion 423 deviates from the correct value.

For this simple model, the computation time for convergence of the P2D method on a SUN Ultra 5 workstation is comparable to that of 1-D inversion for the horizontal resistivity while the 2-D inversion took approximately 5 times as long. For the vertical resistivity, the P2D method took about 12 times as long as the 1-D inversion while the 2-D inversion took about 7 times as long as the P2D inversion. There is thus a significant saving in computation as a result of using the method of the present invention over a full 2-D inversion with little loss in accuracy.

The present invention has been discussed above with respect to measurements made by a transverse induction logging tool conveyed on a wireline. This is not intended to be a limitation and the method is equally applicable to measurements made using a comparable tool conveyed on a measurement-while-drilling (MWD) assembly or on coiled tubing.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of determining a parameter of interest of subsurface formations surrounding a borehole, the method comprising:

(a) obtaining a plurality of measurements indicative of a horizontal and vertical resistivity of the formation;

(b) obtaining a plurality of layer intervals for the subsurface;

(c) defining an initial model for the subsurface;

(d) determining expected values for said plurality of measurements based on said model;

(e) determining a difference between said expected values and actual values of said plurality of said measurements;

(f) determining a sensitivity matrix relating a subset of said plurality of measurements to a subset of said model; and (g) iteratively updating said model by using said subset of the plurality of measurements and said sensitivity matrix, and reducing said difference.

2. The method of claim 1 wherein obtaining said plurality of measurements further comprises conveying an electromagnetic logging tool into the borehole and making said measurements using a plurality of combinations of transmitters and receivers on the logging tool.

3. The method of claim 1 wherein said electromagnetic logging tool comprises a first transmitter having an axis substantially parallel to an axis of the borehole, and second and third transmitters having axes orthogonal to said axis of the borehole and to each other.

4. The method of claim 1 wherein obtaining said plurality of layer intervals further comprises using a HDIL logging tool.

5. The method of claim 1 wherein defining said initial model further comprises using an HDIL logging tool.

6. The method of claim 1 wherein determining expected values of said measurements further comprises using a 2-D modeling program.

7. The method of claim 1 wherein said subset of measurements comprises at least one of (i) a $H_{xx}$ component, (ii)

a $H_{yy}$ component, and, (iii) an average of a $H_{xx}$ component and a $H_{yy}$ component.

8. The method of claim 1 wherein said subset of said model comprises horizontal and vertical resistivities associated with said plurality of layers.

9. The method of claim 1 wherein iteratively updating said model further comprises using the Marquardt-Levenberg algorithm.

10. The method of claim 1 wherein said model comprises, for each of said plurality of layers, (i) a thickness, (ii) a horizontal resistivity, (iii) a vertical resistivity, (iv) a length of an invaded zone, and, (v) a resistivity of an invaded zone.

11. A method of determining a parameter of interest of subsurface formations surrounding a borehole, the method comprising:
  (a) conveying an electromagnetic logging tool into the borehole and using at least one electromagnetic transmitter and one electromagnetic receiver on the tool for obtaining a plurality of measurements indicative of a horizontal and vertical resistivity of the formations;
  (b) obtaining a plurality of layer intervals for the subsurface, each of said layer intervals having a thickness;
  (c) defining an initial model for the subsurface, said subsurface model comprising, for each of said plurality of layer intervals, a horizontal resistivity, a vertical resistivity, a length of an invasion zone, and a resistivity for said invasion zone;
  (d) determining expected values for said plurality of measurements based on said model;
  (e) determining a difference between said expected values and actual values of said plurality of said measurements;
  (f) determining a sensitivity matrix relating a subset of said plurality of measurements to a subset of said model; and
  (g) iteratively updating said model by using said subset of the plurality of measurements and said sensitivity matrix, and reducing said difference.

12. A method of determining a parameter of interest of subsurface formations surrounding a borehole, said formation including invaded zones, the method comprising:
  (a) obtaining a plurality of measurements indicative of a horizontal and vertical resistivity of the formation;
  (b) obtaining a plurality of layer intervals for the subsurface;
  (c) defining an initial model for the subsurface;
  (d) determining expected values for said plurality of measurements based on said model;
  (e) determining a difference between said expected values and actual values of said plurality of said measurements;
  (f) determining a sensitivity matrix relating a subset of said plurality of measurements to a subset of said model wherein said sensitivity matrix does not depend upon parameters of said invaded zones; and
  (g) iteratively updating said model by using said subset of the plurality of measurements and said sensitivity matrix, and reducing said difference.

* * * * *